United States Patent [19]

Hagihara et al.

[11] Patent Number: 4,702,331
[45] Date of Patent: Oct. 27, 1987

[54] SELF-TRAVELING MACHINE

[75] Inventors: Siro Hagihara; Sadahiro Tsutani; Yoichiro Maeda, all of Hyogo, Japan

[73] Assignee: Mitsubishi Denki Kabushiki Kaisha, Tokyo, Japan

[21] Appl. No.: 854,880

[22] Filed: Apr. 23, 1986

[30] Foreign Application Priority Data

May 28, 1985 [JP] Japan ................................ 60-114643

[51] Int. Cl.$^4$ ............................................. B62D 11/06
[52] U.S. Cl. ..................................... 180/9.32; 180/8.7; 180/9.46
[58] Field of Search ......................... 180/9.46, 9.1, 9.3, 180/9.34, 9.44, 8.7

[56] References Cited

U.S. PATENT DOCUMENTS 3,306,250 2/1967 Pitchford ........................ 180/9.32 X
3,417,832 2/1968 Ziccardi .......................... 180/9.32 X

OTHER PUBLICATIONS

IEEE Spectrum, "Robots do the Dirty Work", Apr. 1985, pp. 65–72.

Primary Examiner—John A. Pekar
Attorney, Agent, or Firm—Bernard, Rothwell & Brown

[57] ABSTRACT

A self-traveling machine incorporating a plurality of drive mechanisms each comprising a combination of a crawler unit having an endless belt and a road wheel. The drive mechanisms makes it possible for the machine to travel on and along a stairway and a rough surface ground by actuating the endless belt, for the machine body to be raised from the ground surface by angularly moving the crawler unit into a vertical position with a free end thereof directed onto the ground, and for the machine to stride over an obstacle on the ground by turning the crawler unit thereover from one side to the other side of the obstacle. The machine also includes a steering mechanism for changing the direction of said combination, with the result that the machine is easily steered to change the direction with reduced friction against the ground surface when the crawler unit is being orientated vertically upwardly.

7 Claims, 12 Drawing Figures

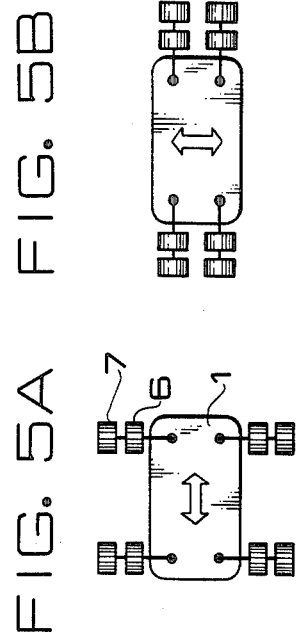
FIG. 5A
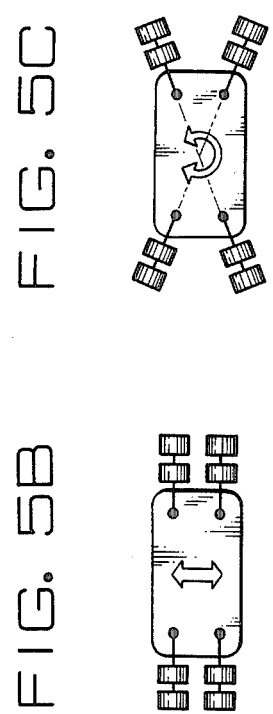
FIG. 5B
FIG. 5C
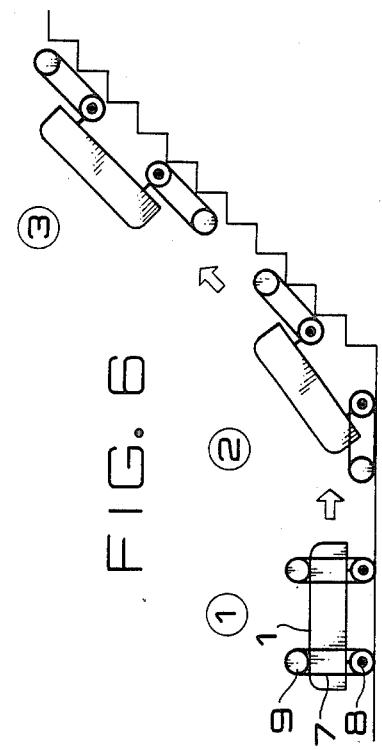
FIG. 6
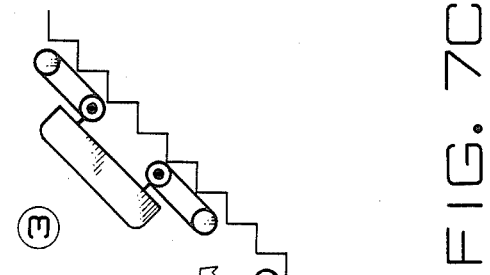
FIG. 7A
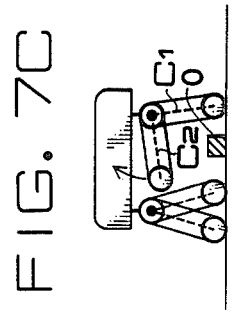
FIG. 7B
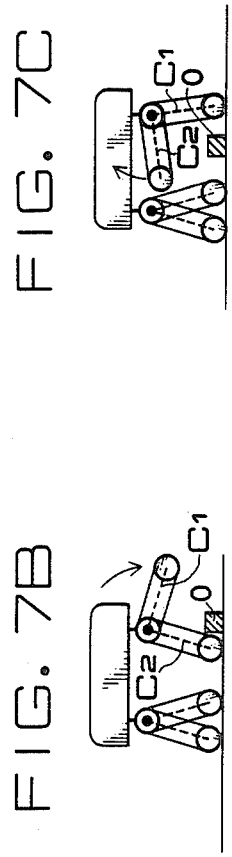
FIG. 7C

4,702,331

SELF-TRAVELING MACHINE

BACKGROUND OF THE INVENTION

1. Field of the Invention

The present invention relates to a self-traveling machine, and more particularly to a self-traveling machine such as a self traveling robot used for automation of a maintenance service in various plants and factories, and adapted for traveling on a flat or rough surface, ascending and/or descending along a stairway and striding over an obstacle such as piping.

2. Description of the Prior Art

One known self-traveling machine is schematically shown in FIG. 1, in which the machine is ascending or descending on a stairway. This prior machine comprises a body designated at numeral 1, and a pair of drive mechanisms (only one shown) each having an endless belt 7 and a drive sprocket 8 on which the endless belt is entrained. The endless belt 7 is driven by the rotation of the drive sprocket 8 for traveling on a flat or rough surface and along the stairway. The machine has a difficulty in changing the traveling direction because of its construction of the drive mechanism described hereinabove, and also has a drawback in that there is a strong possibility that the machine will damage an obstacle on the ground, such as piping, when the machine rides over it.

There is known another self-traveling machine having four drive mechanisms, each having a crawler unit as shown in FIG. 2 (only one shown in cross section). In FIG. 2, a housing designated at numeral 11 has a bracket 12 disposed therein. The drive mechanism includes a drive shaft 13 rotatably mounted in the bracket 12 at one end and carrying a drive sprocket 21 at the other end, a worm wheel 14 mounted on the shaft 13 coaxially with the sprocket 21, and a cylindrical worm gear 15 operatively coupled with the worm wheel 14. The crawler unit 16 includes a horizontal hollow sleeve 16a and a pivotally movable crawler arm 16b integrally extending perpendicularly from one end of the sleeve 16a. The hollow sleeve is rotatably received in an aperture in the housing 11, and the drive shaft 13 is rotatably received therein. A worm wheel 17 is mounted on the hollow sleeve 16a and is operatively coupled with a cylindrical worm gear 18 which rotates the worm wheel 17 to turn the sleeve 16a and hence the crawler arm 16b. The crawler arm 16b has at its distal end a support rod 19 on which an idler sprocket 20 is freely rotatably mounted. An endless belt 22 is entrained on the drive sprocket 21 and the idler sprocket 20. The drive mechanism in FIG. 2 is in a vertical position in which the lowermost end of the endless belt 22 is in contact with the ground surface G.

For traveling on a flat surface, the worm gear 18 is actuated by an actuator such as a motor (not shown) to rotate the worm wheel to thereby angularly move the crawler arm 16 and hence the idler sprocket 20 downwardly from its uppermost position as shown in FIG. 2 to a position in which a lowermost portion of the idler sprocket 20 is placed on the ground G. Then the worm gear 15 is actuated by the motor to rotate the worm wheel 14 and the drive shaft 13 for thereby rotating the drive sprocket 21 so as to move the endless belt to travel the machine.

To travel along the stairway or stride over the obstacle on the ground the crawler arm is controlled to change its angle into a suitable position and then the worm gear 15 is actuated to rotate the sprocket 21 through the worm wheel 14 and the drive shaft 13 for thereby moving the endless belt to ascend or descend the stairway or stride over the obstacle.

The prior self-traveling machine of the above-described type has a drawback in that the lowermost portion of the housing 11 is disposed insufficiently spaced apart, namely by a distance l, from the surface of the ground, and thus the lowermost part is likely to be interfered with by the rough conditioned surface of the ground, steps of the stairway or the top of the obstacle on the ground. As a result the machine is prevented from traveling any further. This is due to the construction of a power transmission assembly which occupies a relatively large space in a vertical direction about the axis of the drive shaft 13, and more specifically due to the structural arrangement in which the worm wheels 14, 17 are disposed in a vertical position adapted to be directly attached to the horizontal drive shaft 13 and the horizontal hollow sleeve 16a of the crawler arm 16, respectively, and the housing is vertically disposed to enclose all those parts.

The prior machine further has a difficulty in achieving an accurate steering of all the four drive mechanisms which are rotated at speeds different from one another when changing the traveling direction, resulting in that the controlling of the machine becomes tedious.

SUMMARY OF THE INVENTION

According to the present invention, a self-traveling machine is able to overcome the above-described drawbacks of the prior machines.

It is therefore an object of the present invention to provide a self-traveling machine which achieves facilitated and stable steering of the machine for all directions.

Another object of the present invention is to provide a self-traveling machine which travels without a difficulty even on surfaces of various rough conditions such as uneven ground, a steeply inclined stairway and the like.

Still another object of the present invention is to provide a self-traveling machine which is able to stride over a relatively high obstacle on the ground.

Many other advantages, features and additional objects of the present invention will become manifest to those versed in the art upon making reference to the detailed description and the accompanying drawings in which preferred embodiments incorporating the principles of the present invention are shown by way of illustrative examples.

BRIEF DESCRIPTION OF THE DRAWINGS

FIGS. 5A, 5B and 5C are schematical plan views showing the manner in which the machine of FIG. 3 changes its traveling direction on a flat ground surface, FIG. 6 is a schematical view showing the manner in which the manner ascends a stairway;

FIGS. 7A, 7B and 7C are schematical views showing the manner in which the machine strides over an obstacle on the ground.

PREFERRED EMBODIMENTS OF THE INVENTION

Preferred embodiments of the present invention are described hereinbelow with reference to the accompanying drawings.

Figures 3, 4:
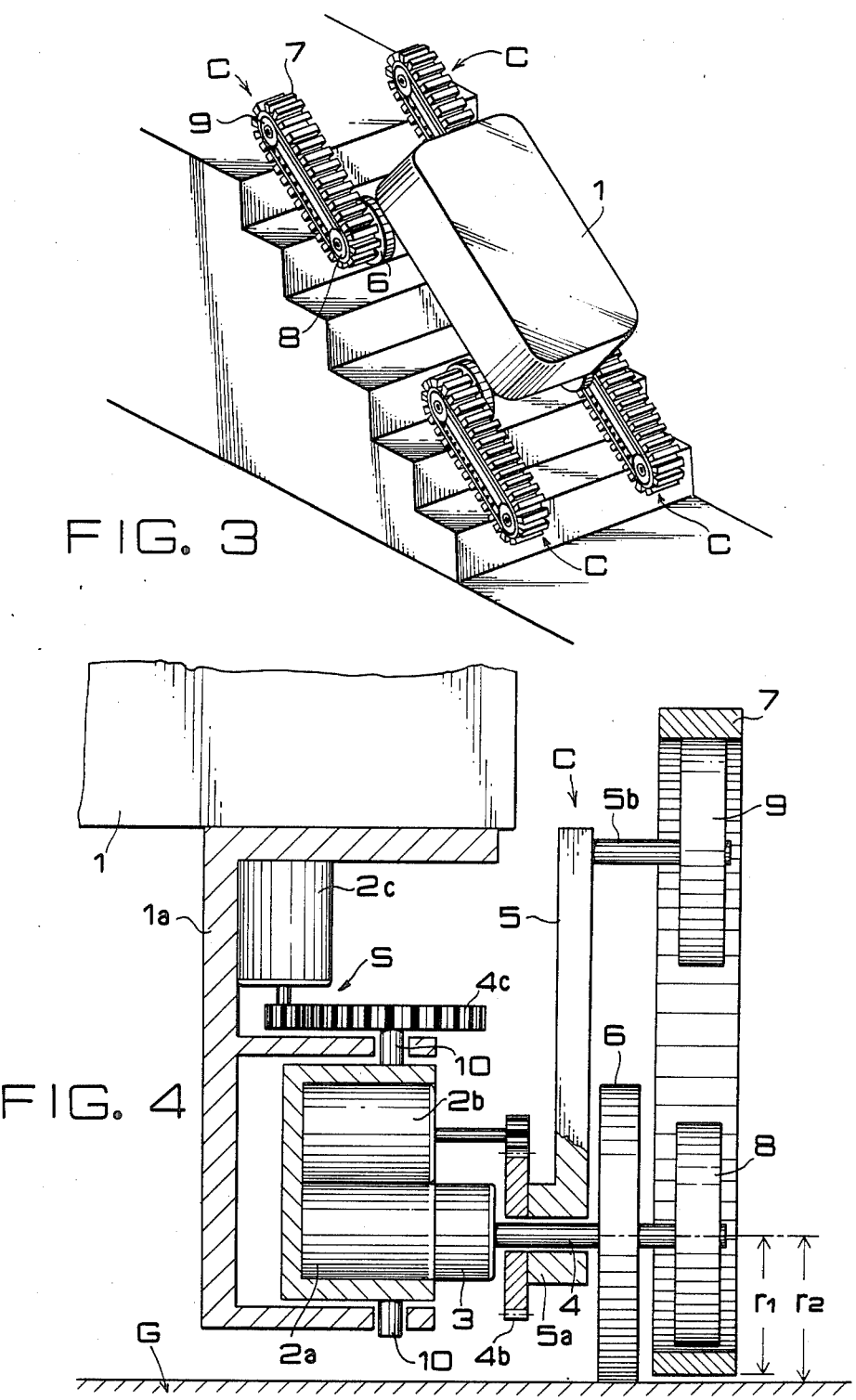
FIG. 3 is a perspective view of a self-traveling machine according to an embodiment of the present invention.
FIG. 4 is a vertical cross-sectional view of a drive mechanism of the machine shown in FIG. 3.

As shown in FIG. 3, a self-traveling machine according to an embodiment of the present invention comprises a machine body designated at numeral 1 and four drive mechanisms. Since the four drive mechanisms are identical with one another, only one drive mechanism is described hereinbelow. The drive mechanism includes crawler units C and a steering mechanism S. In FIG. 4, crawler unit C is positioned vertically on a ground surface G. The crawler unit C includes first and second motors 2a, 2b. The first motor 2a is operatively coupled with a drive shaft or axle 4 through a speed reduction gear assembly 3. The drive shaft extends horizontally and carries thereon a road wheel 6 at an intermediate portion thereof and a drive sprocket 8 at its distal end. The second motor 2b is disposed in a side-by-side relation with first motor 2a. The second motor 2b is operatively connected to a spur gear 4b secured to a sleeve 5a of a crawler arm 5. The crawler arm 5 extends perpendicularly with respect to the drive shaft 4 and has the sleeve 5a at one end and a support rod 5b at the other end. The sleeve portion 5a receives the drive shaft 4 which extends through the same coaxailly such that the crawler arm 5 is pivotally movable about the drive shaft 4. An idler sprocket 9 is freely rotatably mounted on the support rod 5b. The sleeve has a spur gear 4b thereon and operatively connected to the second motor 2b. An endless belt 7 is entrained on the drive sprocket 8 and the idler sprocket 9. The road wheel 6 is secured to the drive shaft 4 between the speed reduction gear assembly 3 and the drive sprocket 8. The road wheel 6 has a radius r2 larger than a distance r1 between the axis of the drive sprocket 8 and a lowermost outside surface of a the endless belt 7 thereabout.

The steering mechanism S includes a third motor 2c and a second spur gear 4c operatively coupled with a drive shaft projecting vertically from the third motor 2c. The spur gear 4c is secured to a pair of coaxial vertical steering shafts 10 which are in turn fixed to a casing supporting the first and second motors 2a, 2b thereon. The steering shafts are rotatably supported by a frame 1a fixed to the machine body 1.

When the self-traveling machine travels on a flat surface ground with the crawler unit C positioned vertically as shown in FIG. 4, the first motor 2a is actuated to rotate the road wheel 6 for thereby traveling the machine. At this time, the endless belt is spaced apart from the ground so as not to hinder a smooth operation of the four road wheels 6. This is also true when the direction of the road wheels 6 is changed by actuating the third motor to rotate the steering shafts 10.

FIGS. 5A-5C respectively show different modes of steering: backward and forward movement (FIG. 5A); sideward movement (FIG. 5B); and on-the-spot turning (FIG. 5C). The four road wheels are steered to change their directions to achieve the above-described steering modes.

FIG. 6 shows the machine traveling along the stairway, in which the positions of the crawler units are changed by actuating the second motor 2b to angularly move or turn the crawler arm 5 and hence the idler sprocket 9 into desired positions. Then the first motor 2a is actuated to drive the drive sprocket 8 and the endless belt 7 for thereby traveling along the stairway.

FIGS. 7A-7C show the machine striding over an obstacle O such as a part of plant facilities on the ground in which the crawler units are in a substantially vertical position so as to raise the machine body 1 up and away from the ground. With thus positioned crawler units, the machine moves closer to the obstacle by driving the endless belt 7 as shown in FIG. 7A. Then one of the crawler units C1 is turned in a direction to move firstly away from one side of the obstacle, then over the latter, and to the other side of the obstacle as shown in FIG. 7B. While the one crawler unit C1 is turning, the remaining three units continue to support the body 1. This operation is repeated successively by the other units. FIG. 7C shows that the second unit C2 is being turned.

The road wheels 6 may be eliminated from the drive mechanism for a modified embodiment of the present invention.

Figure 1:
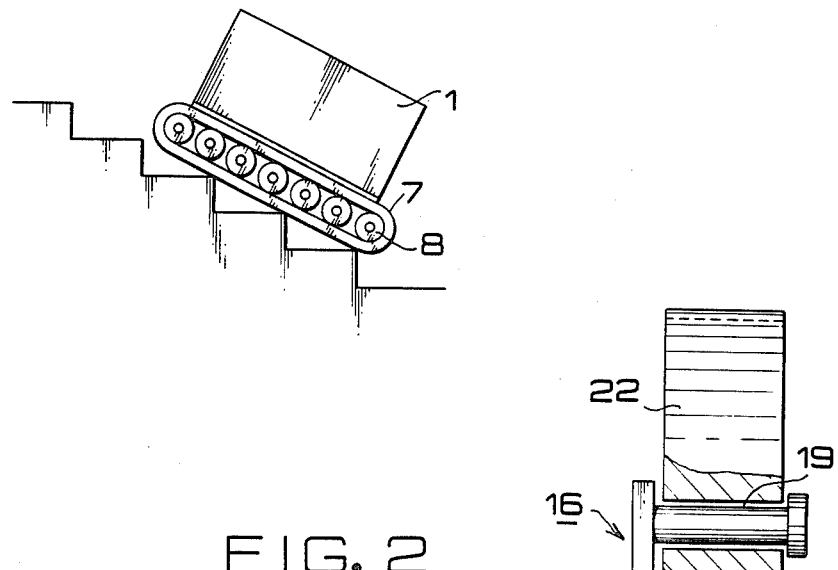
FIG. 1 is a schematical side elevational view of a prior self-traveling machine.
Figure 2:
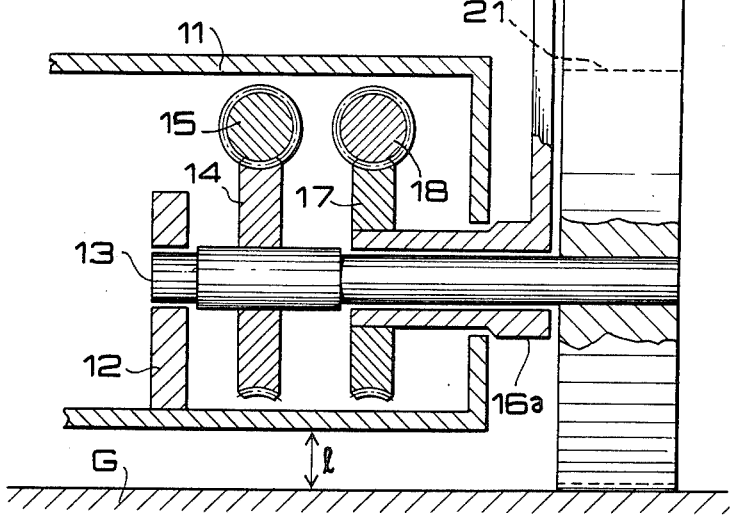
FIG. 2 is a vertical cross-sectional view of a drive mechanism of another prior self-traveling machine.
Figure 8:
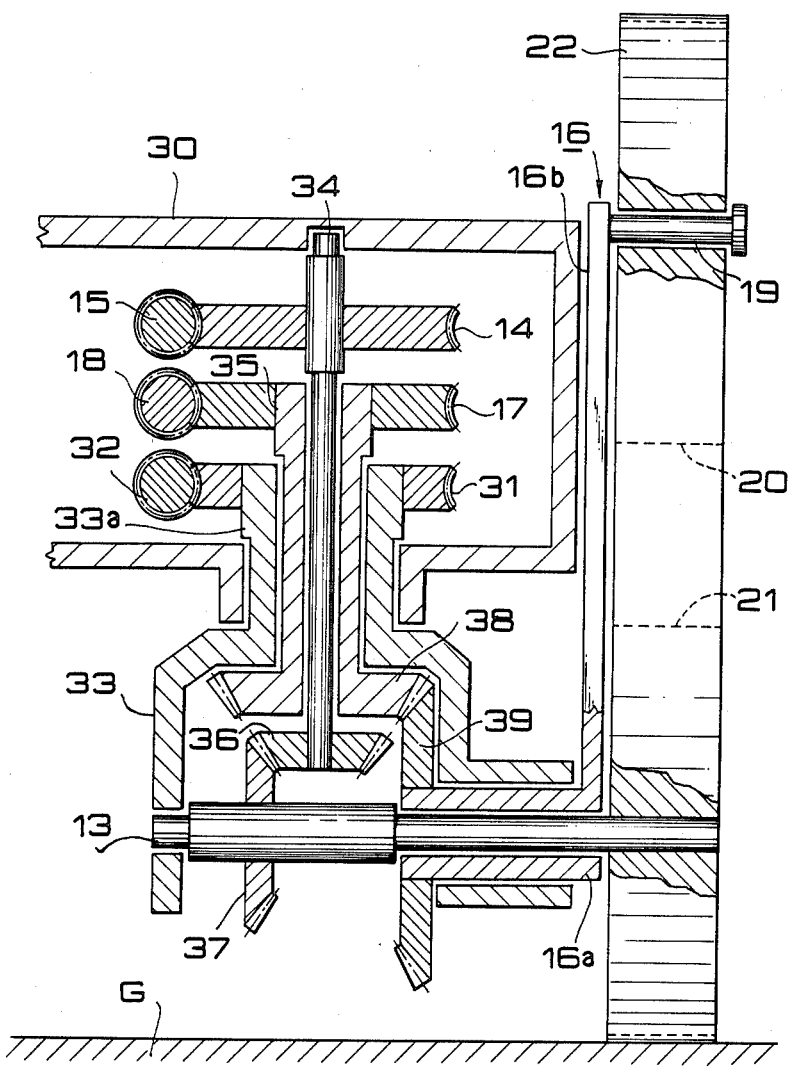
FIG. 8 is a vertical cross-sectional view of a drive mechanism of th self-traveling machine according to another embodiment of the present invention.

FIG. 8 illustrates in a cross-section a crawler unit according to another embodiment of the present invention. In FIG. 8, numerals 13–22 are designated to correspond to their counterparts of the prior machine shown in FIG. 2. A housing is designated at 30. A lower casing 33 is angularly moved by a worm wheel 31 and a worm gear 32 which are disposed together with worm wheels 14, 17 and worm gears 15, 18 within the housing 30. The lower casing 33 has a hollow cylinder 33a which is angularly movably received in the housing 30. A drive shaft 34 is disposed vertically for transmitting a drive force to an axle 13. A hollow drive shaft 35 is also disposed vertically for turning a crawler arm 16, and receives the drive shaft 34 therethrough for allowing the latter to rotate. The two drive shafts 34, 35 are driven to rotate through the worm wheels 14, 17 by the worm gears 15, 18, respectively. A pair of bevel gears 36, 37 are operatively coupled with each other to transmit the rotation of the drive shaft 34 to the axle 13 rotatably supported by the hollow cylinder 33a of the lower housing 33. Another pair of bevel gears 38, 39, are coupled with each other in a similar manner to turn the crawler arm 16. The self-traveling machine, with thus constructed crawler unit, is actuated for traveling on various surfaces such as a flat surface ground, stairway or striding over an obstacle by exerting the power transmission through the bevel gears 36, 37, 38, 39 for thereby driving the axle 13 and turning the crawler arm 16.

The following description specifies the operation of the self-traveling machine.

When the machine changes the traveling direction on the flat surface ground, the worm gear 32 is driven to rotate the lower csing 33 through the worm wheel 31, and then the axle 13 and hence the drive sprocket 21 are driven to rotate for traveling the machine.

For traveling on the stairway or striding over the obstacle, the crawler arm 16 is turned around while the axle 13 and the drive sprocket 21 are driven to rotate.

In the embodiment described hereinabove, the power transmission mechanisms include pairs of worm gears 15, 18, 32 and worm wheels 14, 17, 31 for transmitting the power from an actuator such as a motor to the drive shafts 34, 35 and the lower casing 33. Alternatively, the worm gears and worm wheels may be replaced with pairs of spur gears and bevel gears combined with a speed reduction gear assembly.

The hollow cylinder 33a of the lower casing 33 is disposed outside of the power transmission mechanism 35, 38, 39 of the crawler arm 16 in the illustrative embodiment. Alternatively, the hollow cylinder 33a may be disposed between the drive shaft 34 of the axle 13 and the hollow shaft 35 of the crawler arm 16.

The effective length of the endless belt assembly composed of the endless belt, the drive sprocket and the idler sprocket is determined by the distance between the axis of the support rod 19 and the axis of the axle 13 of the drive sprocket as well as by the length of the longitudinal arm portion of the crawler arm 16b. Thus the effective length may be changed by lengthening or shortening the above described distance and the length. An increased distance between the lowermost portion of the housing 30 and the ground surface G can be obtained by increasing the respective diameters of the drive and idler sprockets 21, 20. The distance therebetween may be increased without changing the diameters of the sprockets 20, 21 by lengthening the distance between the drive shaft 13 and the lowermost portion of the house 30.

With the construction described hereinabove, the self-traveling machine according to the present invention has an advantage in steering the machine in any direction on the flat surface ground, in traveling on a rough conditioned surface or a stairway, or in striding over an obstacle on the ground.

With the road wheel disposed coaxilly with the axle of the drive sprocket and having a radius larger than the distance between the axis of the axle and the top surface of the endless belt portion about the drive sprocket, smooth steering and traveling are achieved by the present machine.

The provision of the steering mechanism for angularly moving the axle and the crawler arm enables an accurate and facilitated control of steering of the machine for adjustment to various surface conditions on which the machine travels.

The present self-traveling machine further has an advantage in facilitating the traveling on a rough surface ground, a stairway and striding over the obstacle with a relatively large height because of an increased distance between the axle and the surface on which the machine travels, since the power transmission mechanism of the crawler arm and the housing enclosing the latter are disposed higher than the axle of the drive sprocket.

What is claimed is:
1. A self-traveling machine comprising:
a machine body;
a plurality of crawler units, each of the units comprising:
an endless belt entrained on a drive sprocket and an idler sprocket, said drive sprocket being fixed to a drive shaft operatively connected to a first drive motor for driving said endless belt, and
a crawler support arm pivotally supported at one end about said drive shaft and carrying at the other end said idler sprocket for free rotation, said arm being operatively connected to a second drive motor for angular movement; and
a steering mechanism supported on said machine body for angularly changing the direction fo said drive shaft and hence said drive sprocket so as to orientate the traveling direction of the machine.

2. A self-traveling machine according to claim 1, each of said crawler units further including a road wheel directly engageable with a surface on which the machine travels, said wheel being disposed coaxially with said drive shaft of the drive sprocket and having a radius larger than the distance between the axis of said drive shaft and the outer surface of said endless belt disposed about said drive sprocket.

3. A self-traveling machine comprising:
a drive shaft and a drive sprocket connected thereto and driven thereby,
an endless belt driven by said drive shaft through said drive sprocket;
a housing disposed at a level higher than said drive shaft;
first and second actuator means within said housing;
a first transmission shaft connected to said first actuator means and to said drive shaft for rotating said drive shaft;
a second transmission shaft having a crawler arm connected thereto, said second transmission shaft being connected to said second actuator means fora turning said crawler arm;
a lower housing for rotatably supporting said drive shaft;
said drive shaft and said crawler arm being angularly movable about a vertical axis to change the traveling direction of the machine.

4. A self-traveling machine comprising:
(a) a machine body;
(b) a support means secured to a lower portion of said machine body for supporting a plurality of drive mechanisms, each of said drive mechanisms comprising,
(c) a first motor supported by said support means and having a drive shaft connected thereto,
(d) a second motor supported by said support means,
(e) a crawler arm driven to pivotally move about one end thereof by said second motor,
(f) a drive sprocket connected to said drive shaft and driven to rotate by said first motor,
(g) an idler sprocket rotatably mounted on the other end of said crawler arm, and
(h) an endless belt entrained on and about said drive sprocket and said idler sprocket; and
(i) a steering mechanism for changing the axial direction of said drive shaft and said crawler arm 5. A self-traveling machine according to claim 4, said steering mechanism including a motor, a drive shaft driven to rotate by said motor, a spur gear operatively connected to said drive shaft, and a steering shaft rotated by said motor through said spur gear.

6. A self-traveling machine comprising:
(a) a machine body,
(b) a plurality of housings secured to a lower portion of said body;
(c) first, second and third actuator means disposed in each of said housings;
(d) a first shaft and a second shaft, operatively connected to said first and second actuator means, respectively, and extending vertically in said housing;
(e) a plurality of axles each having at one end a drive sprocket for supporting an endless belt thereon;

(f) a plurality of crawler arms each actuated to turn about one end by said second shaft and supporting an idler sprocket on the other end; and
(g) a plurality of means for a rotably supporting said axles, respectively, each of said means having a crawler arm connected thereto and being driven to angularly move by said actuator means for thereby angularly moving the corresponding crawler arm and corresponding axle.

7. A self-traveling machine according to claim 6, each of said first, second and third actuator means comprising a worm gear and a worm wheel operatively coupled with each other.

* * * * *

UNITED STATES PATENT AND TRADEMARK OFFICE
CERTIFICATE OF CORRECTION

PATENT NO. : 4,702,331

DATED : October 27, 1987

INVENTOR(S) : Shiro Hagihara et al.

It is certified that error appears in the above-identified patent and that said Letters Patent is hereby corrected as shown below: On the Title, Item [75]

Under the list of inventors, "Siro Hagihara" should be --Shiro Hagihara--.

In the Abstract, line 4, "makes" should be --make--.

Column 1, line 57, after the word "wheel" insert the numeral --17--.

Column 2, line 8, "1" should be --$\ell$--;

line 36, after "achieves" insert --a--;

lines 53-54, "illustative" should be --illustrative--.

Column 3, line 2, "manner" should be --machine--;

line 7, "th" should be --the--;

line 21, after "FIG. 4," insert --a--.

UNITED STATES PATENT AND TRADEMARK OFFICE
CERTIFICATE OF CORRECTION

PATENT NO. : 4,702,331

DATED : October 27, 1987

INVENTOR(S) : Shiro Hagihara et al.

It is certified that error appears in the above-identified patent and that said Letters Patent is hereby corrected as shown below:

Column 6, line 2, "fo" should be --of--.

Signed and Sealed this

Thirty-first Day of May, 1988

Attest:

Attesting Officer

DONALD J. QUIGG

Commissioner of Patents and Trademarks